Oct. 7, 1969 H. L. BROVERMAN 3,471,759

PULSE WIDTH MODULATION SERVO SYSTEM INCLUDING A UNIQUE TRANSFORMERLESS DEMODULATOR

Filed Dec. 23, 1966 7 Sheets-Sheet 1

Inventor,
Howard L. Broverman,
by John F. McDevitt
His Attorney.

Oct. 7, 1969 H. L. BROVERMAN 3,471,759
PULSE WIDTH MODULATION SERVO SYSTEM INCLUDING A UNIQUE TRANSFORMERLESS DEMODULATOR
Filed Dec. 23, 1966 7 Sheets-Sheet 2

Inventor:
Howard L. Broverman,
by John F. McDevitt
His Attorney.

Inventor,
Howard L. Broverman,
by John F. McDevitt
His Attorney.

Inventor;
Howard L. Broverman,
by John F. McDevitt
His Attorney.

Oct. 7, 1969 H. L. BROVERMAN 3,471,759

PULSE WIDTH MODULATION SERVO SYSTEM INCLUDING A UNIQUE TRANSFORMERLESS DEMODULATOR

Filed Dec. 23, 1966 7 Sheets-Sheet 3

Inventor,
Howard L. Broverman,
by John F. McDevitt
His Attorney.

Inventor,
Howard L. Broverman,
by John F. McDevitt
His Attorney.

Inventor,
Howard L. Broverman,
by John F. McDevitt
His Attorney.

United States Patent Office 3,471,759
Patented Oct. 7, 1969

3,471,759

PULSE WIDTH MODULATION SERVO SYSTEM INCLUDING A UNIQUE TRANSFORMERLESS DEMODULATOR

Howard L. Broverman, Pittsfield, Mass., assignor to General Electric Company, a corporation of New York Filed Dec. 23, 1966, Ser. No. 611,521
Int. Cl. G05b *11/00*
U.S. Cl. 318—18 8 Claims

ABSTRACT OF THE DISCLOSURE

Disclosed is a servomechanism of the pulse width modulated type. The system error is a suppressed carrier A.C. modulated signal which is demodulated by a unique transformerless demodulator. The error signal is introduced into a pair of switching transistors which are alternately biased into conduction by square waves 180 degrees out of phase at the carrier frequency. The resultant is summed through a differential amplifier to produce a D.C. signal which is compared in a second differential amplifier with the carrier reference. The output of this differential amplifier controls the "on-time" of an array of power switching transistors in the motor circuit. Since no transformers are used, the circuit lends itself to micro-miniaturization.

This invention relates to a new and improved servo amplifier and mechanism.

More particularly, the invention relates to a new pulse width modulation servo amplifier and mechanism, and to a novel transformer-less demodulator employed in the servo amplifier which makes the amplifier susceptible to manufacture in micro-miniaturized form using integrated circuit techniques.

Servo mechanisms are employed in a wide variety of industrial and military applications for machine tool control, automatic pilot control of airplanes, etc. The number of variety and applications for servo mechanisms can be greatly extended by the provision of small, efficient and relatively low cost servo amplifiers which are reliable in operation. It is particularly desirable to provide such a servo amplifier which can be directly mounted on gimbals, or other types of movable supports, directly with the servo motor which it controls. With such an arrangement, the need for slip rings, extensive wiring connections, etc., can be eliminated with a consequent savings in cost and space. Additionally, the elimination of such components as slip rings in a servo mechanism can greatly improve the overall reliability of the mechanism.

To provide a servo amplifier possessing the above listed desirable characteristics, it is necessary to manufacture the amplifier in micro-miniaturized form using integrated circuit techniques. In order to fabricate the servo amplifier in micro-miniaturized form, and thereby derive all of the above listed benefits in addition to the expected improvement in reliability normally accompanying integrated circuit design, a highly efficient amplifier design having low power dissipation, is required. In addition, if complete micro-miniaturization of the servo amplifier is desired, then no transformers, inductors, large capacitors, etc. can be employed in the design of the amplifier. The present invention was devised to provide a servo amplifier and mechanism which has low power dissipation and is highly efficient and reliable in operation. Preferred embodiments of the invention employ a novel transformer-less demodulator as a part thereof which makes the new and improved servo amplifier susceptible to complete manufacture in micro-miniaturized form.

In practicing the invention, a pulse width modulation servo amplifier that is suitable for micro-miniaturization at least in part, is provided. The pulse width modulation servo amplifier is comprised by demodulation and amplification means together with means for applying a variable magnitude input control signal to one input terminal thereof and for deriving an amplified demodulated control signal from the output. Switching power amplifier means are provided which has its output supplying a servo mechanism device to be controlled. Means are provided for supplying the amplified demodulated control signal to one input of the switching power amplifier means, and the amplifier is completed by a means for supplying a reference switching signal to a second input of the switching power amplifier means which in conjunction with the demodulated and amplified control signal, controls the polarity and magnitude of power pulses supplied to the servo mechanism device being controlled.

In preferred embodiments of the invention the new and improved servo amplifier employs a transformer-less demodulation and amplification means that is comprised by demodulator switching means operatively coupled to and controlled by the direct and inverse output of a second switching signal. The transformer-less demodulation and amplification means is further comprised by differential amplifier means having direct and inverting input terminals. The demodulator switching means serves to couple the variable magnitude input control signal to the direct and inverting input terminal, respectively, of the differential amplifier means during alternate half cycles of the second switching signal whereby a full wave rectified and amplified control signal is obtained from the output of the differential amplifier means.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 1:
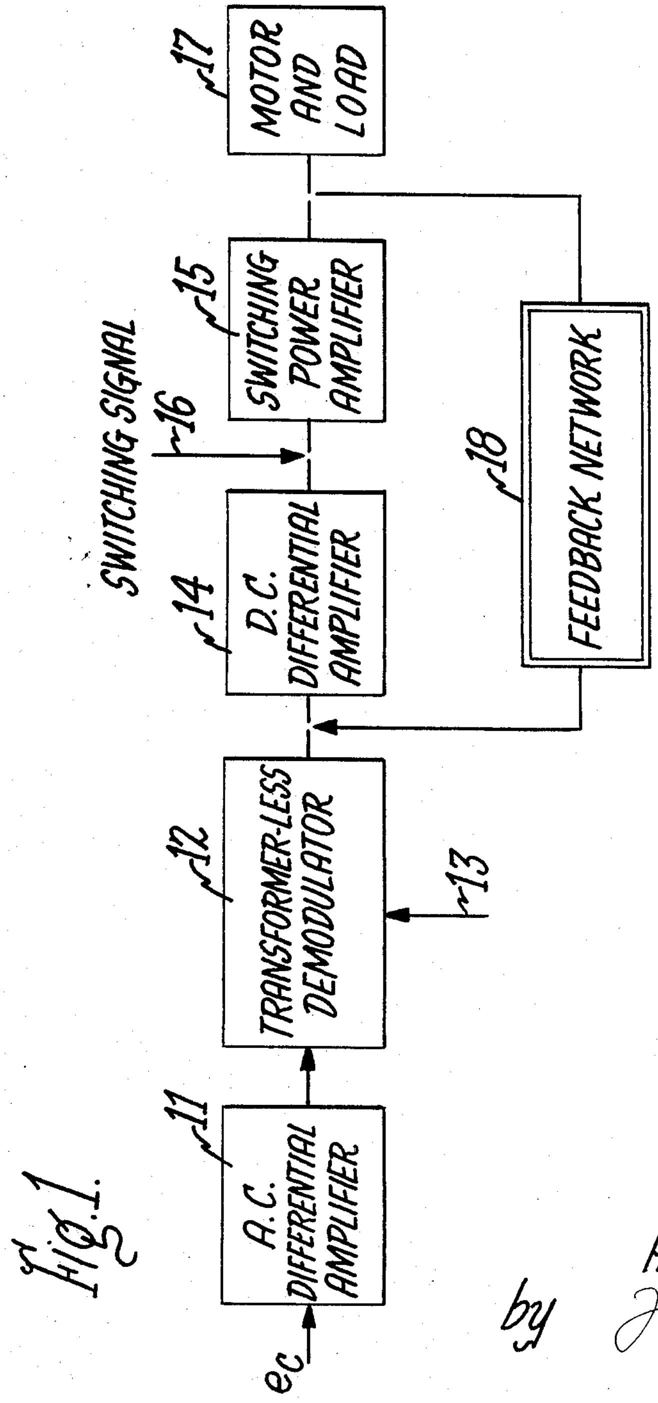
FIGURE 1 is a functional block diagram of a new and improved pulse width modulation servo amplifier and mechanism constructed in accordance with the invention.
Figure 3:
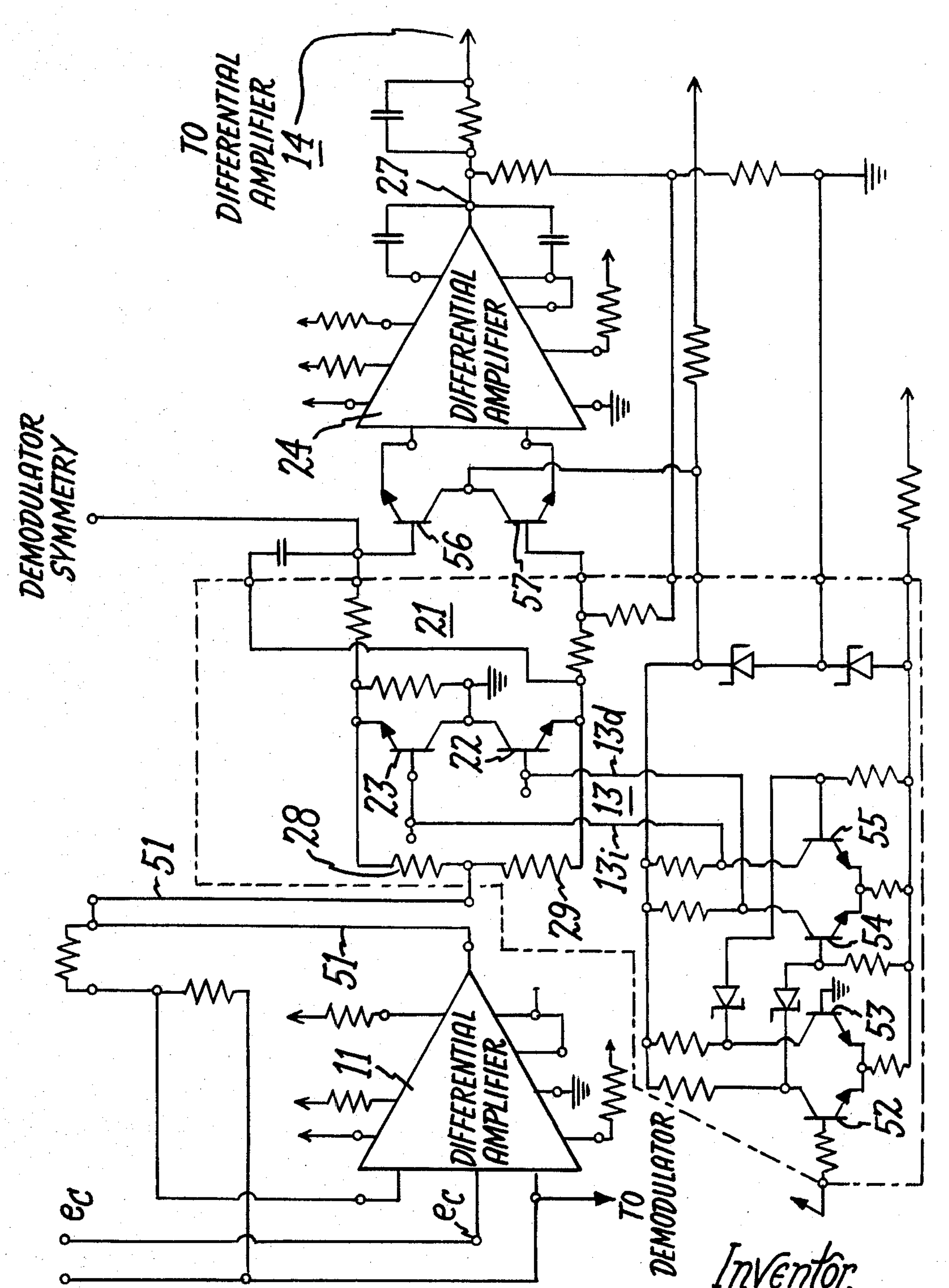
Figure 3A:
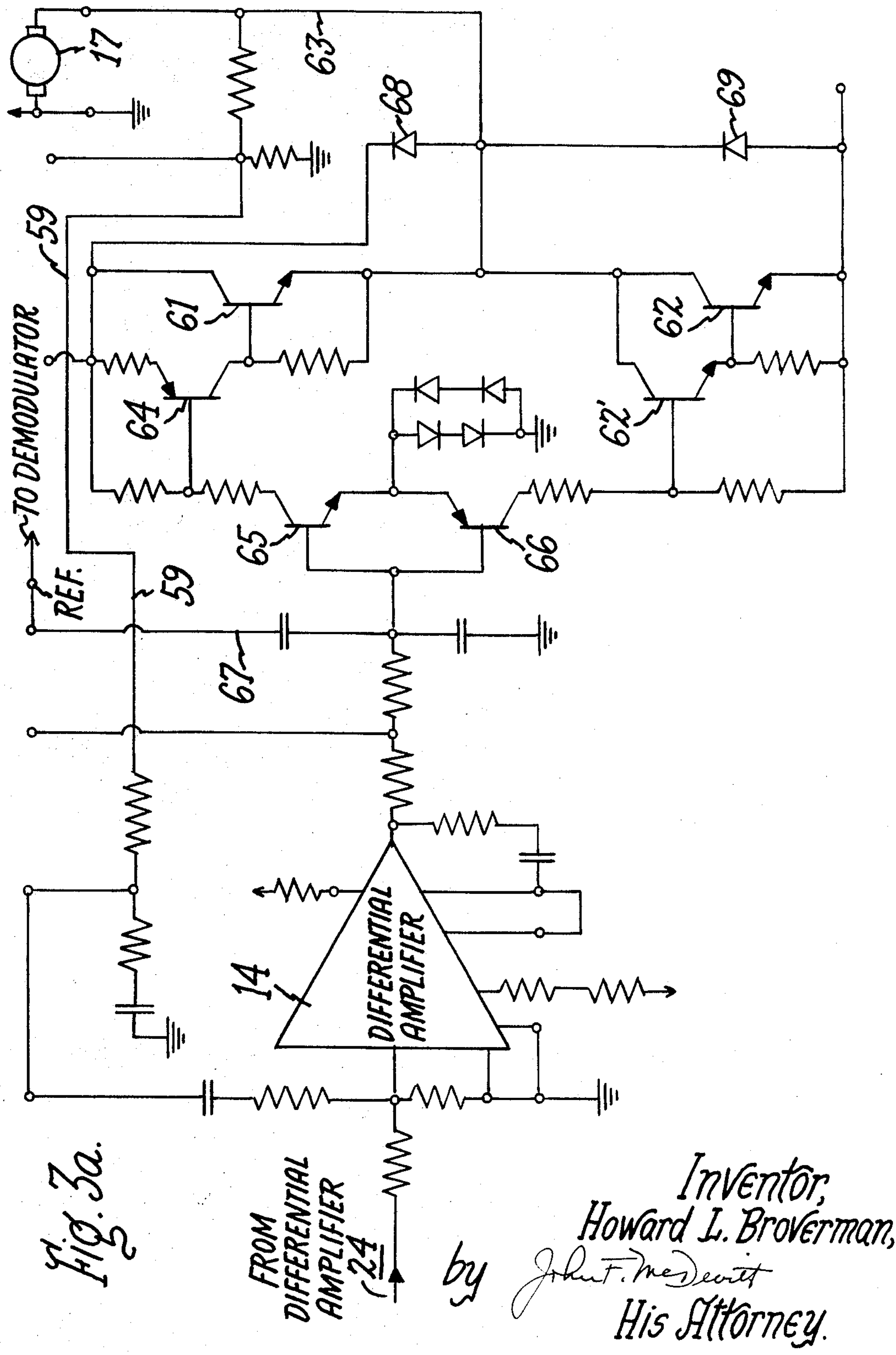
Figure 4:
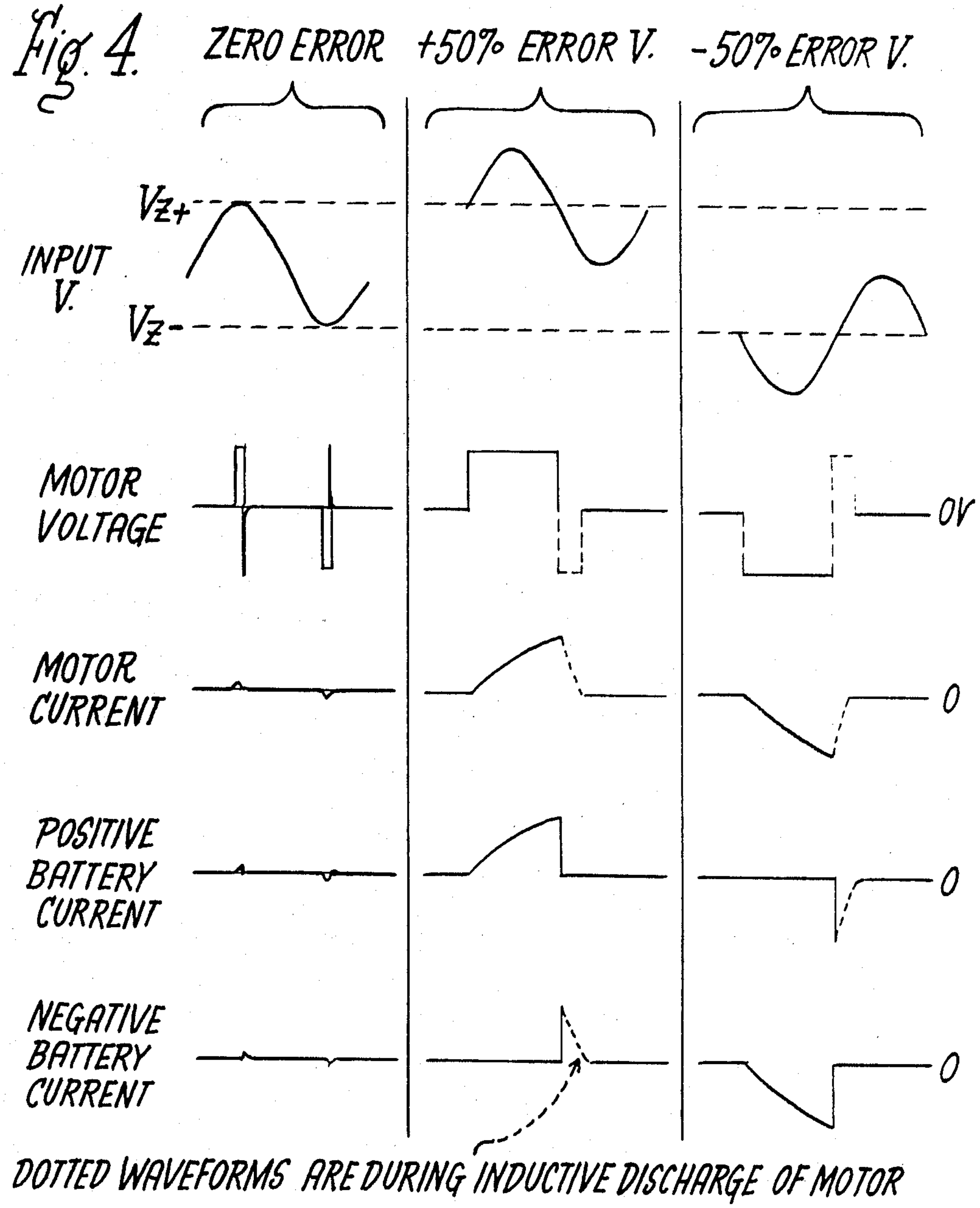
Figure 5:
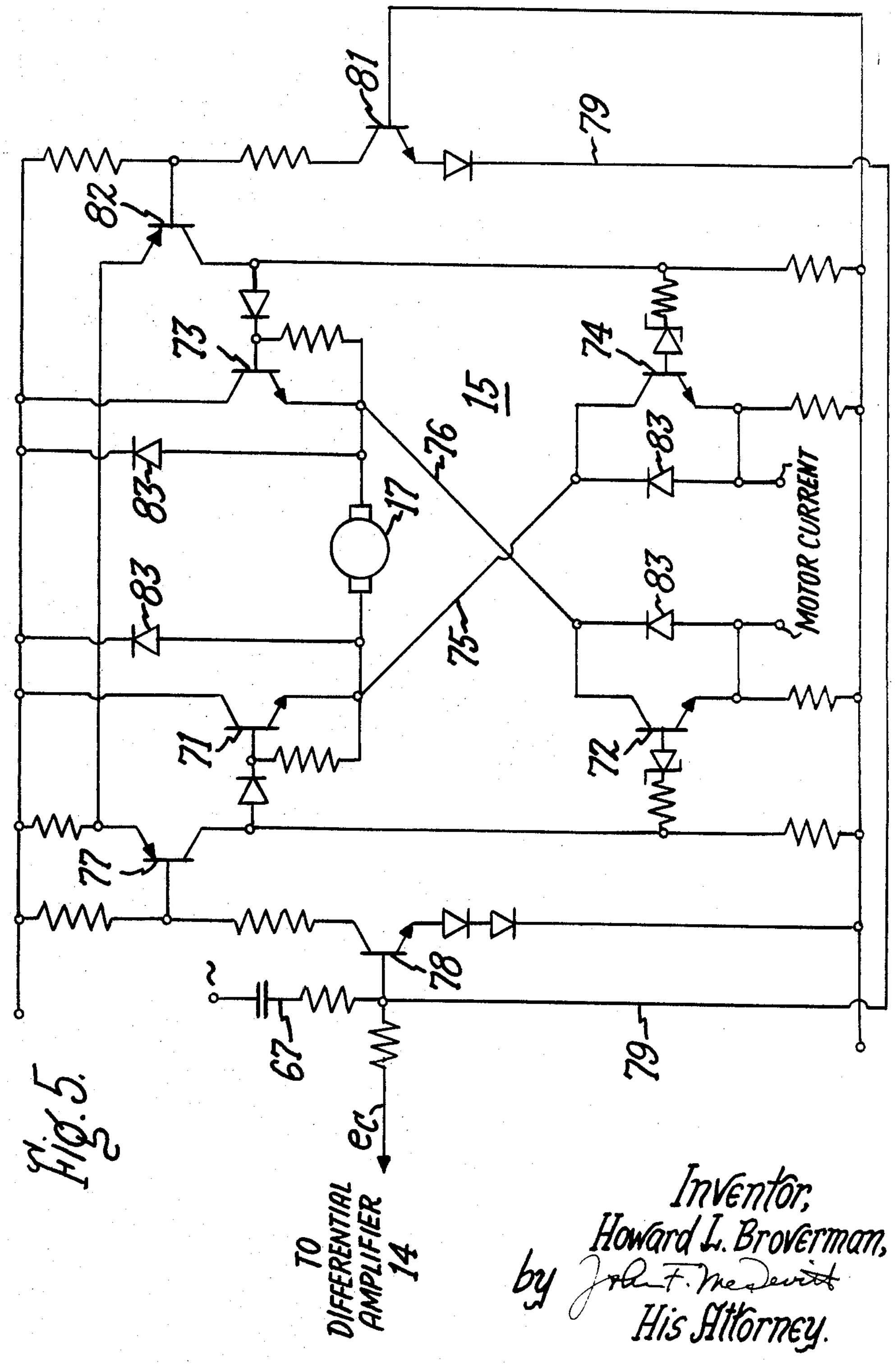
Figure 6:
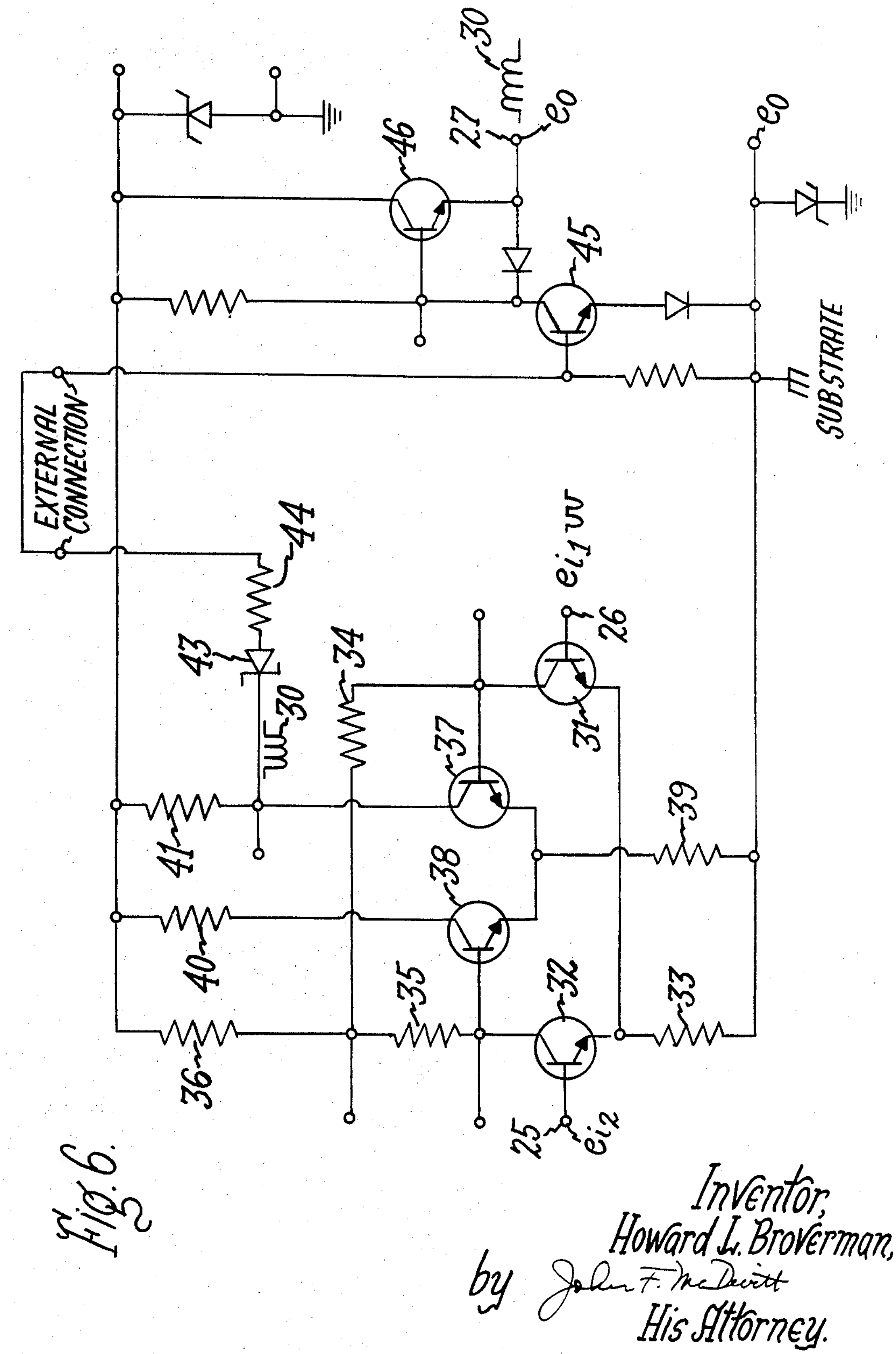

FIGURES 3 and 3*a* jointly constitute a detailed schematic circuit diagram of the pulse width modulation servo amplifier and mechanism shown in FIGURE 1 in block diagram form;

FIGURE 4 is a series of voltage and current versus time characteristic curves illustrating the manner of operation of the amplifier circuit shown in FIGURES 1 and 3;

FIGURE 5 is a detailed schematic circuit diagram of a modified form of a switching power amplifier suitable for use in the new and improved pulse width modulation servo amplifier; and FIGURE 6 is a detailed circuit diagram of a differential amplifier suitable for use in the servo amplifier of FIGURES 1 and 3.

OVERALL PWM SERVO AMPLIFIER SYSTEM

The new and improved pulse width modulation servo amplifier shown in block diagram form in FIGURE 1 is comprised by a conventional alternating current differential amplifier 11 having a variable magnitude input control signal indicated at $e_c$ applied to the input thereof. The output from the differential amplifier 11 is supplied to one input terminal of a transformer-less demodulator 12 having a square wave switching potential indicated at 13 supplied to a second input thereof. The transformer-less demodulator 12 serves to demodulate and amplify the variable magnitude control signal and to supply its ouput to the input of a direct current differential amplifier 14. Differential amplifier 14 has its input supplied to the input of a switching power amplifier 15 in conjunction with a reference switching signal shown at 16. The reference switching signal 16 coacts with the demodulated and amplified variable magnitude control signal supplied from the output of 14 resulting in a train of power pulses supplied to a motor 17 by the switching power amplifier 15. For circuit stabilization purposes, a feedback network 18 is connected between the output of the switching power amplifier 15 and the input of the direct current amplifier 14. If desired, feedback stabilization of the circuit could be achieved with the output of a tachometer generator, accelerometer, or any other type of measuring device that responds to changes in the condition of motor 17.

TRANSFORMER-LESS DEMODULATOR

Figure 2:
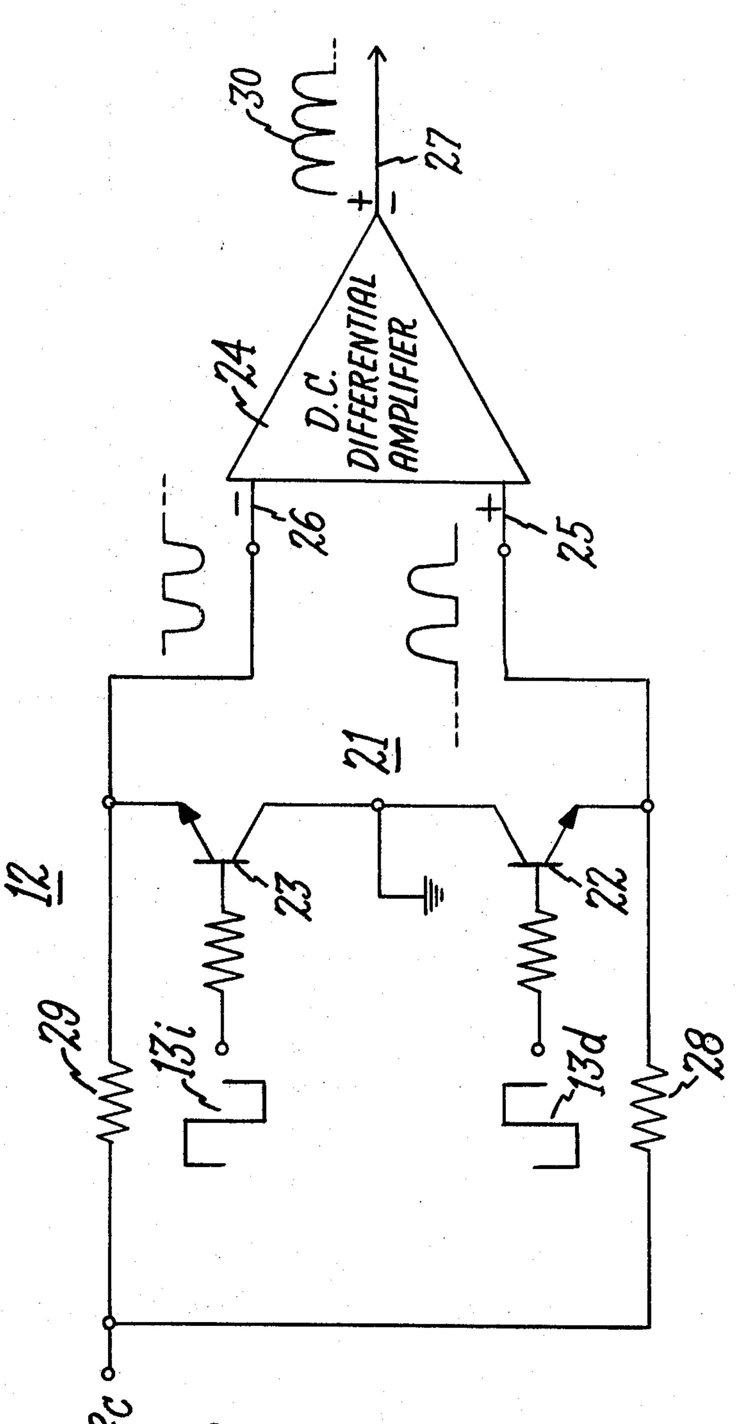
FIGURE 2 is a schematic diagram of a transformer-less demodulator comprising a part of the pulse width modulation servo amplifier shown in FIGURE 1.

As best seen in FIGURE 2 of the drawings, the transformerless demodulator means is comprised by a demodulator switching means 21 formed by a pair of switching transistors 22 and 23, and connected across the input terminals of a differential amplifier 24. The differential amplifier 24 is conventional in construction and has a first direct input terminal 25 and inverted input terminal 26 and an output terminal 27. The switching transistor 22 has its emitter-collector connected across the direct input terminal 25 of differential amplifier 24 in parallel with the alternating current variable magnitude input control signal $e_c$ supplied thereto through a limiting resistor 28. The base of the switching transistor is supplied with a square wave switching potential shown at **13*d* from the direct output terminal of a source of square wave switching signals (not shown) through a suitable limiting resistor. The switching transistor 23 similarly has its emitter-collector connected across the inverse input terminal 26 of differential amplifier 24 in parallel with the input control signal $e_c$ supplied thereto through the limiting resistor 29. The base of the switching transistor 23 is supplied with an inverse square wave switching potential shown at 13*i*** supplied from the inverse output terminal of the source of square wave switching signals.

In operation, during the first half cycle of the square wave reference switching potential, the switching transistor 23 is turned full on to short the input control signal $e_c$ applied to the direct input terminal 25 to ground, and causes this voltage to be less than a millivolt. During this same first half cycle, switching transistor 22 is maintained off, allowing the full value of the input control signal $e_c$ to be applied to the direct input terminal 25. During the second half cycle of the square wave reference switching potential, transistor 23 turns off, and transistor 22 turns full on, allowing the input control signal $e_c$ to appear only at the inverse input terminal 26 of differential amplifier 24. This process creates a train of negative half waves at inverse input terminal 26 and a train of positive waves at direct input terminal 26 which are shifted in phase by 180 degrees from the input waves supplied to the input terminal 25. Since the output of differential amplifier 24 is in phase with the input signal applied to the direct input terminal 26, but gives a phase reversal to the signals applied to the inverse input terminal 25, the output at 27 will be a full wave demodulated and amplified direct current signal as shown at 30. If the polarity of the input control signal $e_c$ should be reversed, the output appearing at 27 would change to a negative going full wave rectified signal. The only capacitors required by the circuit are those that might be employed to smooth the full wave rectified output 30 appearing at the output terminal 27 of differential amplifier 24.

DIFFERENTIAL AMPLIFIER

FIGURE 6 is a detailed schematic circuit diagram of a differential amplifier design that is suitable for use as the differential amplifier 24. As a matter of fact as will be appreciated more fully hereinafter, the differential amplifier design shown in FIGURE 6 can be employed at a number of points in the overall servo amplifier system illustrated in the functional block diagram of FIGURE 1. The differential amplifier shown in FIGURE 6 is comprised by a pair of input npn junction transistors 31 and 32. The direct input terminal 25 is connected to the base of the input transistor 32, and the inverse input terminal 26 is connected to the base of the input transistor 31. The emitters of the transistors 31 and 32 are connected through a common dropping resistor 33 to the negative terminal of a source of supply, and the collectors of the transistors are connected through dropping resistors 34 and 35, respectively, and through a common dropping resistor 36 to the positive terminal of the source of supply. The collectors of the two input transistors 31 and 32 are also connected to the base electrodes of a pair differentially connected npn junction transistors 37 and 38, respectively.

The differentially connected transistors 37, 38 have their emitters connected through a common resistor 39 to the negative terminal of the source of supply, and have their collectors connected through load resistors 41 and 42, respectively, to the positive terminal of the source of supply. The combined demodulated output signal obtained across load resistor 41, is coupled through a Zener diode 43 and a limiting resistor 44 to the base of a first npn junction transistor 45. The junction transistor 45 comprises the input stage of a two stage transistor amplifier further comprised by an npn junction transistor 46 having its base connected to the collector of the first stage transistor 45. The differential amplifier output is obtained from the output terminal 27 that is connected to the emitter of the second stage transistor 46.

In operation, the differential amplifier shown in FIGURE 6 will function to combine the two input signals $e_i$1 and $e_i$2 supplied to the input terminals 25 and 26, respectively, to provide a combined output to the two stage amplifier output comprised by transistors 45 and 46. By combining the two input signals in this manner, it can be appreciated that the circuit in effect functions as a full wave rectifier device to provide a full wave demodulated and amplified output signal at the output terminal 27. In the event that the polarity of the input control signal $e_c$ supplied to the input of the transformer-less demodulator circuit reverses in polarity, the polarity of the input signal $e_i$1 and $e_i$2 will be reversed to thereby reverse the polarity of the demodulated and amplified output signal 30 appearing at the output terminal 27.

DETAILED SCHEMATIC OF OVERALL SYSTEM

FIGURE 3 is a detailed schematic circuit diagram of the overall new and improved pulse width modulation servo amplifier and mechanism constructed in accordance with the invention and shown in block diagram form in FIGURE 1. In FIGURE 3, the incoming variable magnitude control signal $e_c$ is applied to the input terminal **11*a* of a differential amplifier 11. The differential amplifier 11 may be fabricated in precisely the same manner as the differential amplifier shown in FIGURE 6 of the drawings but has its supply voltages, feedback, etc. adjusted for operation as an alternating current amplifier. When thus adjusted, the amplifier can be used as a high gain, high stability feedback amplifier having high input impedance. Feedback is obtained by connection of a discrete feedback resistor in the manner shown to allow for adjustment of the feedback to provide optimum operating conditions. The output from amplifier 11 is supplied over the conductor 51 to the input of the transformer-less demodulator 21**.

Since the transformer-less demodulator was described in detail in connection with FIGURES 2 and 6 of the drawings, a further description of the construction and operation of this portion of the servo amplifier is believed unnecessary. In considering the transformer-less demodulator circuit 21, it should be noted that all of the active portions of the low signal level circuitry of the new and improved pulse width modulation servo amplifier, including the demodulation function, are implemented using differential amplifiers. By this implementing the low signal level circuitry, the entire amplifier can be fabricated in micro-miniature form. In devising the transformer-less demodulator circuit, development effort was pointed towards a circuit which could provide the demodulation function with a capability of being integrated, that is to say it could contain no transformers or inductors and could include capacitors for filtering only and should have low power dissipation. To minimize the filtering problem it was considered mandatory that the circuit provide full wave demodulation. The resultant transformer-less demodulator shown at 21 provides full wave demodulation without the use of transformers and have very low power dissipation. The circuitry comprised by the junction transistors 52 through 55 converts a suitable reference sine wave (having a value of at least four-tenths of a volt root means square) into a balanced square wave reference switching potential for the switching transistors 22 and 23.

In operation when the switching transistor 23 is turned on, the control signal $e_c$ at the emitter of transistor 22 gets applied to the direct input terminal of the differential amplifier 24, and is amplified with no phase reversal. During the next half cycle, transistor 22 turns on, and transistor 23 turns off, allowing the signal at the emitter of switching transistor 23 to be applied to the input of the differential amplifier. The polarity of the signal has reversed but the differential amplifier gives a phase reversal to the input signals from the emitter of the switching transistor 23. As a result the polarity at the differential amplifier output is the same as for the first half cycle. Accordingly, the result is a direct current change in the differential amplifier output in the form of a full wave demodulation. Feedback from the output of the differential amplifier 24 establishes the overall demodulator gain and stability.

The desirable features provided by the transformer-less demodulator are that offset voltage changes of the switching transistors 22 and 23 cancel each other in the differential amplifier. The symmetrical configuration of the demodulator allows for cancellation of resistor changes with temperature. Direct current coupling may be used into the input of the demodulator with only secondary direct current effect on the demodulator output. The direct current offset at the input of the demodulator cancels in the differential amplifier output and appears only as alternating current noise. If desired emitter followers may be added to the output as shown at 56 and 57 to reduce the direct current switched by the switching transistors 22 and 23. Inclusion of the emitter followers 56 and 57 results in a reduction in noise. Capacitor filtering may be used to smooth the full wave output appearing at the output terminal 27. The circuit thus comprised shows excellent linearity with acceptable drift.

The demodulated and amplified control signal 30 appearing at the output terminal 27 is applied to the input of a direct current differential amplifier 14. Differential amplifier 14 may comprise a micro-miniaturized modular amplifier similar to that shown in FIGURE 6 of the drawings. It can be appreciated therefore that the new and improved servo amplifier system lends itself to the use of a general purpose differential amplifier that can serve as both a high gain DC or AC amplifier. Its characteristics should be such that for a zero volt input a substantially zero volt output is obtained. The amplifier should provide large dynamic swing and good decoupling from supply line variations. It should have good stability with temperature and feedback gain control should be feasible using externally connected components. The amplifier should be capable of operation with either a single or double input and provide either a single or a double output. The differential amplifier circuit shown in FIGURE 6 of the drawings possess all of these characteristics and comprises a basic building block employed in all of the low level signal circuitry of the overall servo amplifier system.

From the above considerations, it can be appreciated that the design of the servo amplifier is such that it can employ a standardized differential amplifier circuit as a component subassembly thereof which is capable of fabrication using micro-miniaturization techniques to greatly reduce the size of the overall servo amplifier. It is anticipated that with this design a complete servo amplifier for driving a 75 watt direct current motor load, complete with servo stabilizing networks, can be packaged in a one inch cube with maximum power dissipation in the neighborhood of 6 to 9 watts. Application of the servo amplifier is also feasible to larger loads calling for peak currents as high as 100 amperes at 100 volts. By mass producing the differential amplifier chips, the cost of the overall system can be greatly reduced. In addition, because of the substantially fully integrated character of the servo amplifier, its reliability is greatly improved. This tremendous improvement in reliability is particularly advantageous in cases where the servo amplifier will be used in connection with gimbal mounted motor drives. With such arrangements, the extreme small size of the servo amplifier allows it to be mounted on the gimbal supporting, structure or other movable support, along with the motor and results in a reduction in wiring as well as elimination of the need for slip rings. The reduced size and weight of the electronics further greatly reduces the size of the battery and heat sink requirements of the circuit thereby allowing a further reduction in overall size of the servo amplifier. An additional desirable feature made possible by the design, is that its extreme small size permits additional built in redundancy, thus further improving overall reliability of the system.

The output from the direct current differential amplifier 14 is applied to the input of the switching power amplifier 15. Maximum benefit from integrated circuit (microminiaturized) design of a gimbal servo amplifier can be realized only if the power dissipation can be kept low, particularly in the larger power stages. A significant improvement over the normal 50% efficiency limitation of conventional class B direct current power amplifiers is necessitated. The pulse width modulation servo amplifier made possible by the present invention provides better than 90% efficiency in applying power to a direct current motor. This considerable improvement in overall efficiency is made possible through the use of the switching power amplifier 15 to apply power to the DC motor 17. In the switching power amplifier 15, the resultant direct current error signal supplied from the output of differential amplifier 14 is added to a sine wave switching reference to operate a switching power amplifier supplying pulse width modulated power pulses to the DC motor 17. A servo stabilizing feedback network may be provided between the output of the switching power amplifier 15 back to the input of the direct current differential amplifier 14 through a connector 59, and for most applications would be composed of discrete components to provide the accuracy desired. It should be noted that, if desired, servo feedback could be obtained from a load motion sensing device such as a tachometer generator or an accelerometer to give better servo torque response. If servo feedback is obtained from such a load motion sensing device, the need for discrete components in the feedback network is eliminated.

SWITCHING POWER AMPLIFIER

The switching power amplifier shown in FIGURE 3 requires a split center tapped power supply, and is comprised by a pair of switching power transistors 61 and 62, 62'. The switching power transistors can comprise either single power transistor devices such as shown at 61, or could comprise dual darlington power stages such as shown at 62, 62'. Such dual power stages are manufactured and sold commercially. The Minneapolis-Honeywell Company, for example, sells such dual power stages in a TO-5 case with a $V_{CE}$ saturated rating of 1.5 volts at 1 ampere. If higher maximum motor current is required, the darlington pair could be comprised by a STC-2N2034 (3 amps, 3 ohm) power transistor and a TO-46 driver, or any other low saturation resistance transistor with adequate current and voltage capability.

The switching power transistor 61 has its collector connected to a source of positive 28 volts and its emitter connected through a common conductor to one terminal of the servo motor 17. The remaining terminal of the servo motor 17 is connected to ground, it being understood that the negative side of the positive 28 volt center tap power supply likewise is grounded. Conversely, the power transistor 62 has its emitter connected to the terminal of a negative 28 volt supply and its collector connected through the common conductors 63 to motor 17. The base of switching power transistor 61 is connected to the collector of a pnp junction transistor 64 that in turn has its base connected to the collector of an input npn junction transistor 65. Similarly, the base of transistor 62' in the darlington pair is connected to the collector of an input pnp transistor 66. The bases of both of the input transistors 65 and 66 are connected in common to the output of the direct current differential amplifier 14, and also are connected in common through the conductor 67 to a source of reference switching potential. The reference switching potential may have a sinusoidal wave shape, but if desired a triangular, sawtooth or other wave shape reference switching potention may be employed. To complete the power circuit, circulating diodes shown at 68 and 69 are connected in reverse polarity parallel circuit relationship with each of the switching power transistors 61 and 62. As a consequence of this arrangement, the circulating diodes 68 and 69 will be connected in series circuit relationship with the motor 17 and respective halves of the center tapped power source.

In operation the direct current differential amplifier 14 output is added to a fixed amplitude sine wave switching reference supplied over the conductor 67 at the base of each of the input transistors 65 and 66. The amplitude of the sine wave switching potential is set such that with zero superimposed direct current control signal from the output of differential amplifier 14, the peak value is equal to or slightly greater than the Zener diode and base to emitter voltage required to turn on transistor 65 or 66. Therefore, for no direct current control signal, none of the transistors in the circuit will be rendered conductive for more than a very small portion of the sine wave switching potential, and results in no net direct current component being supplied to the motor 17. FIGURE 4 of the drawings shows the wave shapes involved in the switching power amplifier for zero direct current control signal, plus 50% and −50% direct current control signal. From a consideration of the wave shapes shown in the left hand zero error column, it will be appreciated that essentially zero current is supplied to the motor 17.

If a positive direct current control signal appears at the output of the differential amplifier 14, and increased portion of the positive half of the sine wave reference switching potential turns the input npn junction transistor 65 on. This results in turning on the transistors 64 and 61, and in supplying a train of positive going current pulses to the motor 17 which have a net direct current valve that is proportional to the direct current control signal supplied from differential amplifier 14. An increase in the direct current control signal from differential amplifier 14 increases the duty cycle and results in increasing the direct current voltage and current to the motor 17. This condition is shown in the middle column of FIGURE 4 of the drawings. It can be appreciated from FIGURE 4 that current supplied to the motor will be pulsed or discontinuous in nature up to some given percentage of duty cycle (about 85%) at which point the supply of current to motor 17 becomes continuous.

A negative going direct current control signal supplied from the output of differential amplifier 14 will serve to turn on the pnp input transistor 66. This results in turning on the darlington pair 62' and 62 to thereby apply negative going current pulses to the motor, and results in driving the motor in a reverse direction. This condition is shown in the right hand column of FIGURE 4 for a negative control signal at the output of differential amplifier 14. In FIGURE 4 the exponential rise in decay of motor current is shown for a ratio of switching period to a motor inductive time constant of approximately 4 to 1. It should be noted that in this arrangement the inductive kick of the motor forces the power transistors to be capable of withstanding twice the voltage that can be applied to the motor. It should also be noted that the inductive discharge of the motor, following turn off of one of the switching power transistors 61 or 62, 62' operates to pump current back through the circulating diodes 68 or 69 to the power supply. This is useful power, if stored, and can give useful torque; however, the type of power supply must be such that the energy storage can occur. That is to say rectifier circuits used for the power supply would have to be equipped with capacitors for the energy storage requirement. It should be further noted that at the end of each current pulse to the motor 17, the inductance of the motor winding has to discharge its energy back through the flyback or circulating diodes 68 or 69. This allows the discharge to occur without requiring that the power transistors 61 or 62, 62' stay on. The net result is that the power transistors have high voltage across them only when the current is low, and therefore have low power dissipation.

FIGURE 5 of the drawings is a detailed schematic circuit diagram of an alternative form of switching power amplifier suitable for use as a switching power amplifier 15 in the servo amplifier system shown in FIGURE 1. The switching power amplifier shown in FIGURE 5 may be employed with a single power supply source where there is no requirement that it be center tapped as with the arrangement shown in FIGURE 3. In the switching power amplifier shown in FIGURE 5, four switching power transistors 71 through 74 are provided, and are connected in a conventional Wheatstone bridge fashion. If desired instead of single power transistor devices, the devices 71 through 74 may comprise darlington pairs. The motor 17 is connected to one set of opposite terminals of the bridge arrangement comprised by the switching power transistors 71 through 74. For this purpose, switching power transistors 71 and 73 have their collector electrodes connected to the positive terminal of the power supply, and have their emitter electrodes connected to opposite terminals of motor 17. The emitter of switching power transistor 71 is cross connected through a conductor 75 to the collector of the switching power transistor 74, and the emitter of transistor 73 is cross connected through a conductor 76 to the collector of the switching power transistor 72. The switching power transistors 72 and 74 have their emitters connected through suitable dropping resistors to the negative terminal of the power supply.

The base of the switching power transistor 71 is connected to the collector of a pnp driving transistor 77 also having its collector connected to the base of the switching power transistors 72. The base of the driving transistor 77 is connected through a suitable dropping resistor to the collector of an npn input transistor 78. The input transistor 78 has its base connected to the output of the differential amplifier 14, and through the conductor 67 to the sourse of sinusoidal reference switching potential. The output of the differential amplifier 14 and conductor 67 are also connected through a conductor 79 to the emitter of a second input npn junction transistor 81 having its base grounded. The collector of the second input transistor 81 is connected through suitable dropping resistors to the base of a second pnp driving transistor 82 and to the positive terminal of the power supply. The second pnp driving transistor 82 in turn has its collector connected in common to the base electrodes of each of the power switching transistors 73 and 74. The power circuit is completed by circulating or feedback diodes 83 connected in reverse polarity, parallel circuit relationship with each of the switching power transistors 71 through 74.

With the switching power amplifier shown in FIGURE 5, the maximum voltage that the power transistors 71 through 74 must withstand is only equal to that voltage that may be applied to the motor 17, instead of twice the motor voltage as in the center tapped power supply arrangement shown in FIGURE 3. Operation of the circuit is similar to that described for the switching power amplifier shown in FIGURE 3 with the exception of the slaved operation of the lower bridge transistors 72 and 74. Thus, upon the power transistor 71 being switched on due to a positive control signal at the output of the differential amplifier 14, the switching power transistor 74 will be inhibited from conducting due to an inhibiting potential supplied thereto across the conductor 75. Turn on potential applied to switching power transistor 71 also is applied to switching power transistor 72 so that a conducting path can be traced through the transistor 71, motor 17, conductor 76 and transistor 72. Upon the polarity of the control signal at the output of the differential amplifier 14 reversing, a reverse polarity path can be traced through the transistor 73, motor 17, conductor 75 and transistor 74.

From the foregoing description it can be appreciated that the invention provides a new and improved pulse width modulation servo amplifier and mechanism which has low power dissipation and is highly efficient and reliable in operation. Further it can be appreciated that preferred embodiments of the invention employ a novel transformerless demodulator as a part thereof which renders the new and improved servo amplifier susceptible to complete manufacture in micro-miniaturized form. As a consequence of this feature, and the pulse width modulation power output scheme which provides better than 90% efficiency in applying power to the servo motor, a complete servo amplifier can be provided which is susceptible to manufacture in the form of a one inch cube, and which can be mounted directly on gimbal supports with the servo motor which it controls. With such arrangement, the need for slip rings extensive wiring, etc. is obviated thereby greatly improving the overall reliability of the servo mechanism.

Having described several embodiments of a new and improved pulse width modulation servo amplifier and mechanism constructed in accordance with the invention, it is believed obvious that other modifications and variations of the invention are possible in the light of the above teachings. It is therefore understood that changes may be made in the particular embodiments of the invention described which are within the full intended scope of the invention as defined by the appended claims.

What I claim as new and desire to be secured by Letters Patent of the United States is:

1. A pulse width modulation servo amplifier suitable for micro-miniaturization at least in part including in combination demodulation and amplification means wherein the demodulation and amplification means comprises transformerless demodulation and amplification means, means for applying a variable magnitude input control signal to one input of said demodulation and amplification means and for deriving the amplified demodulated control signal therefrom, switching power amplifier means having its output supplying a device to be controlled, means for supplying to one input of the switching power amplifier means the amplified demodulated control signal from the output of the demodulation and amplification means and means for supplying a reference switching signal to a second input of the switching power amplifier means in conjunction with the demodulated and amplified control signal for controlling the polarity and magnitude of power pulses supplied to the device to be controlled.

2. An amplifier according to claim 1 wherein the transformerless demodulation and amplification means comprises demodulator switching means operatively coupled to and controlled by the direct and inverse outputs of a second switching signal, and differential amplifier means having direct and inverting input terminals, said demodulator switching means serving to couple the variable magnitude input control signal to the direct and inverting input terminals, respectively, of the differential amplifier means during alternate half cycles of the second switching signal whereby a full wave rectified and amplified control signal is obtained from the output of the differential amplifier means.

3. An amplifier according to claim 2 wherein the demodulator switching means comprises a pair of switching transistors connected across the direct and inverting input terminals of the differential amplifier means in parallel circuit relationship therewith and with the control signal source, the second switching signal comprising a source of square wave switching potential having the direct and inverse outputs thereof coupled to the base electrodes of respective ones of said pair of switching transistors.

4. An amplifier according to claim 3 wherein additional amplification means are provided between the output of the transformerless demodulation and amplification means and the input to the switching power amplifier means.

5. An amplifier according to claim 4 wherein feedback means are operatively coupled between the device being controlled and the input of the additional amplification means.

6. A servo mechanism comprising a servo amplifier according to claim 5 wherein the device to be controlled is a servo motor.

7. A servo mechanism according to claim 6 wherein the switching power amplifier means includes at least one pair of controlled power semiconductor switching devices for reversely connecting the servo motor across a power source, the conductivity of the power semiconductor switching devices being controlled by the sum of the demodulated and amplified control signal and the reference switching signal effectively supplied to the control electrodes thereof, and a respective circulating diode connected in reverse polarity parallel circuit relationship across at least each of said power semiconductor switching devices and in series circuit relationship with the servo motor for circulating energy trapped in the motor winding during non-conducting intervals of the power semiconductor switching devices.

8. A servo mechanism according to claim 7 wherein the switching power amplifier means comprises at least four controlled power semiconductor switching devices arranged in a bridge for reversely connecting the servo motor across the power source with the servo motor being operatively connected between one set of opposite terminals of the bridge and the power source being connected across the remaining set of opposite terminals of the bridge.

References Cited

UNITED STATES PATENTS

| | | |
|---|---|---|
| 2,478,203 | 8/1949 | McCoy. |
| 3,260,912 | 7/1966 | Gregory. |

ORIS L. RADER, Primary Examiner

THOMAS E. LYNCH, Assistant Examiner

U.S. Cl. X.R.

318—28, 130, 448